United States Patent [19]

Mikuni et al.

[11] Patent Number: 5,506,942

[45] Date of Patent: Apr. 9, 1996

[54] APPARATUS OF OUTPUTTING A TRAIN OF CHARACTERS

[75] Inventors: Shin Mikuni, Hamura; Shigeo Kurakake, Hanno, both of Japan

[73] Assignee: Casio Computer Co., Ltd., Tokyo, Japan

[21] Appl. No.: 113,835

[22] Filed: Aug. 30, 1993

[30] Foreign Application Priority Data

Sep. 1, 1992 [JP] Japan ................................. 4-255372
Sep. 11, 1992 [JP] Japan ................................. 4-269569

[51] Int. Cl.$^6$ ................................................. G06F 15/00
[52] U.S. Cl. ......................................... 395/110; 395/102
[58] Field of Search ................................. 395/110, 108,
395/142, 150, 151, 155, 102, 117, 143,
144, 145, 146, 148; 382/9, 44, 47; 345/141,
142, 143, 127, 128, 129, 130, 144, 192,
193, 194, 195

[56] References Cited

U.S. PATENT DOCUMENTS

| | | | |
|---|---|---|---|
| 4,459,431 | 7/1984 | Hiroichi et al. ........................ | 395/108 |
| 4,562,594 | 12/1985 | Bednar et al. ........................ | 382/9 |
| 4,873,643 | 10/1989 | Powell et al. ........................ | 395/155 |
| 5,253,599 | 10/1993 | Hashiride ........................ | 112/121.12 |
| 5,313,896 | 5/1994 | Hashiride ........................ | 112/121.12 |

*Primary Examiner*—Mark R. Powell
*Assistant Examiner*—Dov Popovici
*Attorney, Agent, or Firm*—Frishauf, Holtz, Goodman, Langer & Chick

[57] ABSTRACT

A train of characters as the output target is designated by a key operation section and an area lying between two lines is designed as a character train layout range. A character frame generator evenly divides the character train layout range by the number of characters in the character train to determine the character frame coordinates of the individual characters. Then, the character frame generator compensates for the width of each character frame in accordance with the ratio of that character frame occupying in the character train layout range. A print data generator alters individual characters to the sizes corresponding to the obtained character frames, and lays out and prints the altered characters in the associated character frames.

6 Claims, 12 Drawing Sheets

COORDINATE INFORMATION

STRAIGHT LINE ⟶ TWO POINTS

CURVE ⟶ FOUR POINTS

APPARATUS OF OUTPUTTING A TRAIN OF CHARACTERS

BACKGROUND OF THE INVENTION

1. Field of the Invention

The present invention relates to a character train outputting apparatus, used in a word processor or the like, for laying out a train of characters as an output target in a previously designated layout range.

2. Description of the Related Art

In general, in a word processor or the like, the format of a document is defined by setting the number of digits or characters per line. A document is prepared according to this format and this document is printed by a printer. In this case, the expression of characters largely depends on the hardware (memory capacity, printer, built-in fonts, screen resolution, etc.) in character display or printing, and it is in this expression that the features of individual word processors become apparent. Generally speaking, most word processors can use a full font size, a half font size, a quarter font size, horizontally double-expanded font size, vertically double-expanded font size and horizontally and vertically double-expanded font size for characters, can designate the pitch character by character or line by line, and are equipped with functions of underlining, character ornamentation, and drawing gridlines. In preparing text, many word processors draw an underline or expand the character size with respect to specific characters or a specific line to enhance the characters or line. Those operations are called "character ornamentation."

Word processors are designed to set the desired format when printing a prepared document. The format setting is performed by inputting or selecting the desired values in or for the set items, such as character pitch, line pitch, the number of characters per line, the number of lines per page and character point. A document is output from a printing device, such as a printer, based on the thus set format.

Some word processors perform outline font edition on image data or data called from a dictionary to print out smoother lines. The "outline font" is a character font expressed by several points indicated by coordinates and an outline connecting those points, and is prepared based on information of the coordinates of several dots as the start point, held as data, by computing a line, which passes the start point and traces the associated character, and smoothly linking the center at the time of character display or printing. Since only the coordinate data from the start point is needed, a smaller memory is sufficient to store finer fonts and enlargement, reduction and alteration of characters are easier as compared with dot fonts.

However, the above-described character ornamenting method can be executed only in a predetermined manner and basically character by character, and has a very poor degree of freedom, so that it cannot meet the users' demand sufficiently.

If, for example, to enhance an arbitrary train of characters, the magnifications of the individual characters constituting that character train are continuously changed to gradually reduce the characters from the head character toward the end character, a character train with depth feeling can be output. This technique is very effective as one way to enhance a character train. To perform such enhancement, conventionally, it is very difficult to make a character wider when the character is tall or to make the character narrower when the character is short, while setting the vertical and horizontal magnifications of characters character by character. It is therefore practically almost impossible to acquire a balanced character train with natural depth feeling, so that not everyone can easily obtain a naturally-linked character train.

SUMMARY OF THE INVENTION

It is therefore a primary object of the present invention to provide a character train outputting apparatus which can easily and quickly output a balanced train of characters naturally linked in the vertical and horizontal directions and having depth feeling or a character train with an abundant variation of shapes.

According to one aspect of this invention, there is provided a character train outputting apparatus comprising character train designating means for designating a train of characters as an output target; layout range designating means for designating an area lying between at least two lines as a character train layout range; character frame determining means for evenly dividing the character train layout range, designated by the layout range designating means, by the number of characters in the character train designated by the character train designating means, to thereby determine character frames for that number of characters; compensation means for compensating a width of each character frame with respect to the character train layout range designated by the layout range designating means, based on ratios of occupancy of individual character frames determined by the character frame determining means; and output means for altering the individual characters to sizes corresponding to the character frames compensated by the compensation means and laying out the altered characters in the associated character frames.

According to the one aspect of the present invention, a balanced train of characters naturally linked in the vertical and horizontal directions and having depth feeling or a character train with an abundant variation of shapes can be easily and quickly output.

According to another aspect of this invention, there is provided a character train outputting apparatus comprising input means for inputting a train of characters; curve designating means for designating curves; character train layout means for laying out the character train, entered through the input means, on a closed curved surface acquired by linking end points of a plurality of curves designated by the curve designating means; and output means for altering and outputting character data based on layout information from the character train layout means.

According to the another aspect of the present invention, a train of characters along arbitrary curves can be laid out, thus ensuring the preparation of very expressive and impressive documents.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3A and 3B illustrate the divided states of character frames in the case where an area lying between straight lines is used as a character train layout range, FIG. 3A showing the divided state before compensation while FIG. 3B shows the divided state after compensation;

FIGS. 4A and 4B illustrate the divided states of character frames in the case where an area lying between two arcs is used as a character train layout range, FIG. 4A showing the divided state before compensation while FIG. 4B shows the divided state after compensation;

FIGS. 5A and 5B illustrate the divided states of character frames in the case where an area lying between two Bezier curves is used as a character train layout range, FIG. 5A showing the divided state before compensation while FIG. 5B shows the divided state after compensation;

DETAILED DESCRIPTION OF THE PREFERRED EMBODIMENTS

First Embodiment

A first embodiment of the present invention will now be described referring to FIGS. 1 through 5.

Figure 1:
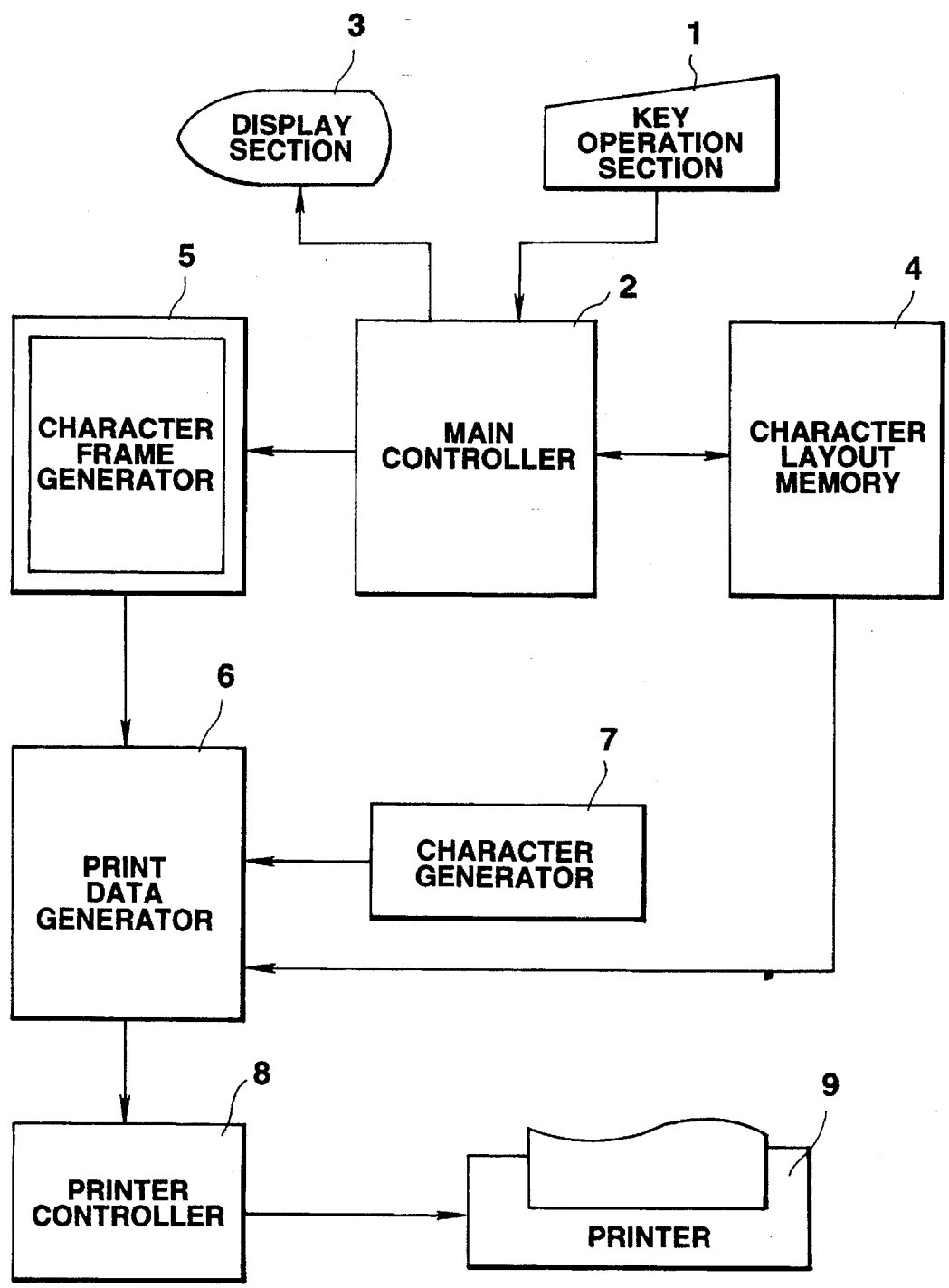
FIG. 1 is a block diagram showing the structure of a character train outputting apparatus according to a first embodiment of the present invention.

FIG. 1 is a block diagram showing the structure of a word processor.

A key operation section 1 has various character keys, function keys, etc. Data of a train of characters input from the key operation section 1 is taken into a main controller 2, constituted of a CPU, and is then displayed on the text screen of a display section 3 or is stored in a character layout memory 4. This memory 4 stores character train data as a print target and an area (character train layout range) which is associated with the character train data and where this character train is laid out. When an arbitrary character train layout range is designated through the key operation section 1, the main controller 2 stores it into the character layout memory 4. The character train layout range is specified by the area lying between two lines, and is designated through the key operation section 1. As the types of those two lines, a straight line, Bezier curve and an arc are prepared in advance in this embodiment. When arbitrary types are specified among those three types and the shape of a character train layout range sandwiched between two lines is arbitrarily specified, value data (shape, position data) representing this character train layout range is stored in the character layout memory 4. A point on each line is represented by a single parameter, the parameter at the start of the line being represented by "0" and the parameter at the end of the line by "1." The parameter of any point on each line has a value equal to or smaller than "1." Data in the character layout memory 4 is read out in response to a print instruction entered through the key operation section 1, and is sent to a character frame generator 5 from the main controller 2.

Figure 2:
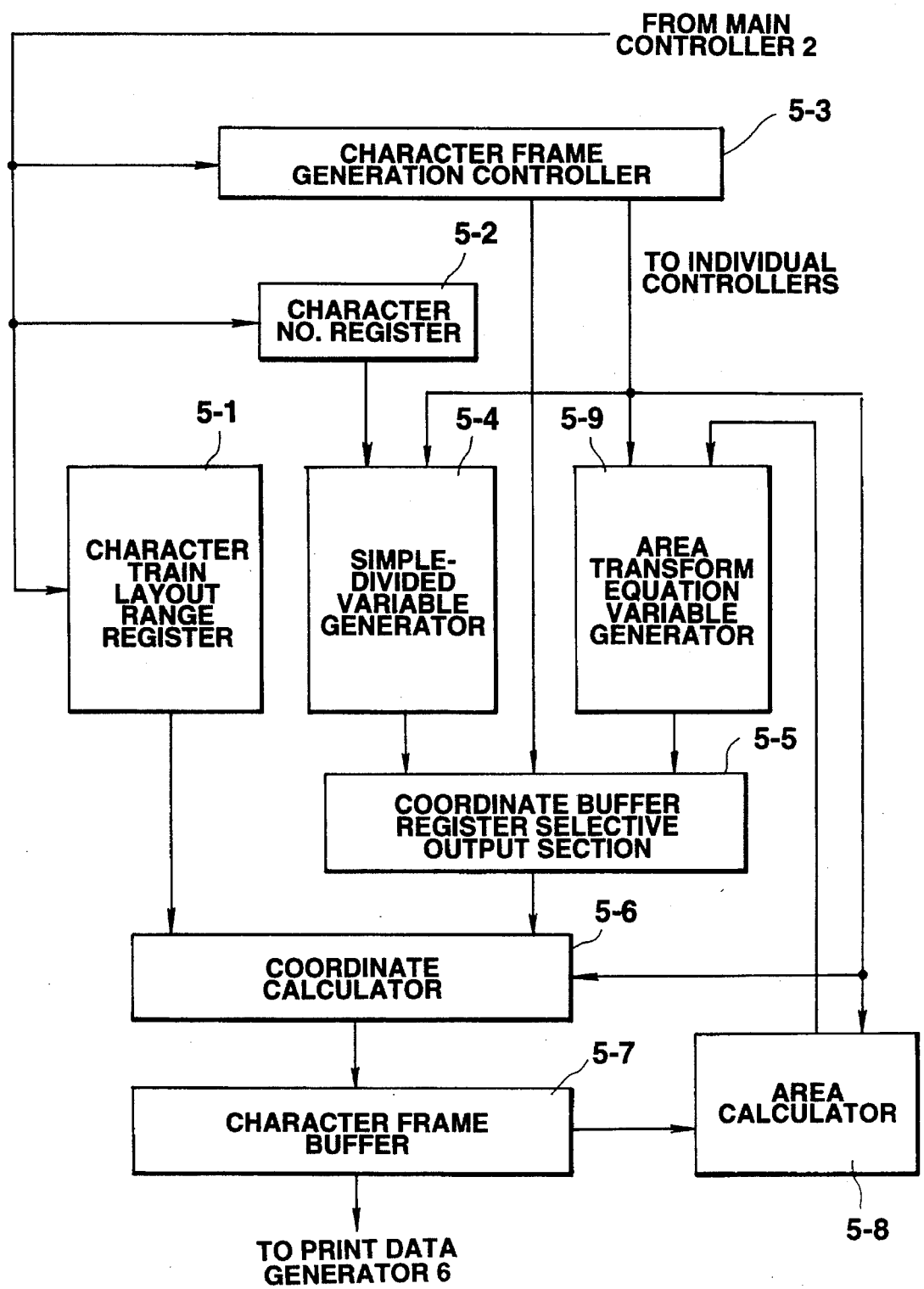
FIG. 2 is a block diagram showing the structure of the character frame generator shown in FIG. 1.

The character frame generator 5, constituted as shown in FIG. 2, generates character frame coordinates (positional coordinates of four corners that define character frames) for all the characters constituting the character train, based on the value data representing the character train layout range and the number of characters constituting the character train as the print target. The character frame generator 5 then sends the character frame coordinates character by character to a print data generator 6. In this case, the main controller 2 reads out a train of characters as the print target from the character layout memory 4 character by character from the head character and sequentially sends the characters to the print data generator 6.

Based on the character codes sent character by character from the character layout memory 4, the print data generator 6 accesses a character generator 7 to read the corresponding character pattern. The print data generator 6 transforms the character pattern to the size corresponding to the character frame based on the character frame coordinates corresponding to the character pattern, sent from the character frame generator 5, and lays out the character pattern at the position in this character frame before sending it to a printer controller 8. The printer controller 8 accumulates the character pattern, sent from the print data generator 6, into an internal buffer (not shown), and activates a printer 9 to print out the character pattern. The printer 9 is constituted of a dot printer, such as a thermal printer or a liquid crystal printer.

The structure of the character frame generator 5 will now be described in detail referring to FIG. 2, which is a block diagram showing the structure of this generator 5.

Data from the main controller 2 is set in a character train layout range register 5-1 and a character no. register 5-2. The register 5-1 is a value register which holds the shape and position, representing the area sandwiched between two lines, as values, and the register 5-2 is a value register which holds the total number of characters constituting the character train. A character frame generation controller 5-3 controls a sequence of operations for generating the character frame coordinates, character by character, in accordance with the values of the character train layout range register 5-1 and character no. register 5-2, and sends control signals to the individual sections constituting the character frame generator 5. When a print instruction is given to the generation controller 5-3 through the main controller 2 from the key operation section 1, this controller 5-3 drives a simple-divided variable generator 5-4 first.

The generator 5-4 evenly divides the parameters "0" to "1" according to the value of the character no. register 5-2 to generate values of the parameters of the character start position (left-hand position of a character) and the character end position (right-hand position of that character) of each character in the character train. That is, with the number of characters being "4," for example, the parameters become t=0, t=0.25, t=0.5, t=0.75 and t=1, and the generated individual parameters are stored in a variable buffer register of a coordinate buffer register/selective output section 5-5. The character frame generation controller 5-3 gives a transfer instruction to the selective output section 5-5 in such a way as to send the parameters of the start and end positions of each of the characters constituting a character train, character by character, to a coordinate calculator 5-6.

The coordinate calculator 5-6 reads value data, representing the two lines that define the character train layout range, from the character train layout range register 5-1, computes the positional coordinates of two points on each of the two lines (a total of four points) from the values of the parameters for one character (parameters of the start and end of the character) sent from the coordinate buffer register/selective output section 5-5, and stores the coordinates as character frame coordinates into a character frame buffer 5-7. In this case, the character frame coordinates are plane coordinates representing the positions of the four corners of the character frame, and the character frame coordinates generated for each character from the coordinate calculator 5-6 are stored in the character frame buffer 5-7. The character frame thus stored in the buffer 5-7 is acquired by simply dividing the character train layout range evenly, causing a variation in the shapes of the individual character frames, so that the character frames may not be linked naturally. In this embodiment, therefore, an area calculator 5-8 and an area transform equation variable generator 5-9 are provided in the character frame generator 5 to compensate for the shape variation or difference, so that the shapes of the individual character frames are approximated to ensure natural linkage of the character frames.

The area calculator 5-8 reads the coordinates of the individual character frames from the character frame buffer 5-7, obtains the areas of the individual character frames frame by frame based on the coordinates, obtains the total area of all the character frames, and sends the acquired areas to the area transform equation variable generator 5-9. This generator 5-9 computes the values of new parameters based on the various areas acquired by the area calculator 5-8, and sets the new parameters into the variable buffer register of the selective output section 5-5 to compute the coordinates of the character frames again based on the new parameters.

The operation of this embodiment will be described below.

Suppose that the area lying between two straight lines L1 and L2 is designated as a character train layout range through the key operation section 1 and the character train designated as the output target consists of six characters as shown in FIG. 3. When a print instruction is given from the key operation section 1 in this condition, the value data representing the layout range of the character train and the number of characters are given to the character frame generator 5, and are set in the character train layout range register 5-1 and character no. register 5-2, respectively.

Then, in the character frame generator 5, the simple-divided variable generator 5-4 is activated to evenly divide the parameters "0" to "1" by the character number "6," yielding the parameters of the individual characters, t0=0, t1=0.167, t2=0.333, t3=0.499, t4=0.667, t5=0.833 and t6=1, and to set those parameters into the coordinate buffer register/selective output section 5-5.

In FIG. 3, for the purpose of descriptive simplification, the end side (right-hand side) of one character is set identical to the start side (left-hand side) of the adjacent character to the right, so that the pitch between characters will not become wider.

Next, the character frame generation controller 5-3 instructs the selective output section 5-5 to send the parameters of the start and end points of the first character to the coordinate calculator 5-6 and activates the coordinate calculator 5-6. Then, the coordinate calculator 5-6 computes the coordinates of two points on each of the two lines from the data representing the two lines from the character train layout range register 5-1 and the parameters from the selective output section 5-5. In this case, the computation is executed as follows:

$$X=(x_2-x_1)t+x_2$$

$$Y=(y_2-y_1)t+y_1$$

where $(x_1, y_1)$=coordinates of the start point on a line and $(x_2, y_2)$=coordinates of the end point on that line. It is to be noted that the coordinates of the character frame should be computed so that there will be no gap between character frames.

When the coordinates of the first character frame is obtained, they are written in the character frame buffer 5-7. The same operation is repeated for the coordinates of the second character frame, the coordinates of the third character frame and so forth to acquire the coordinates of the character frames of all the characters.

Figure 3A:
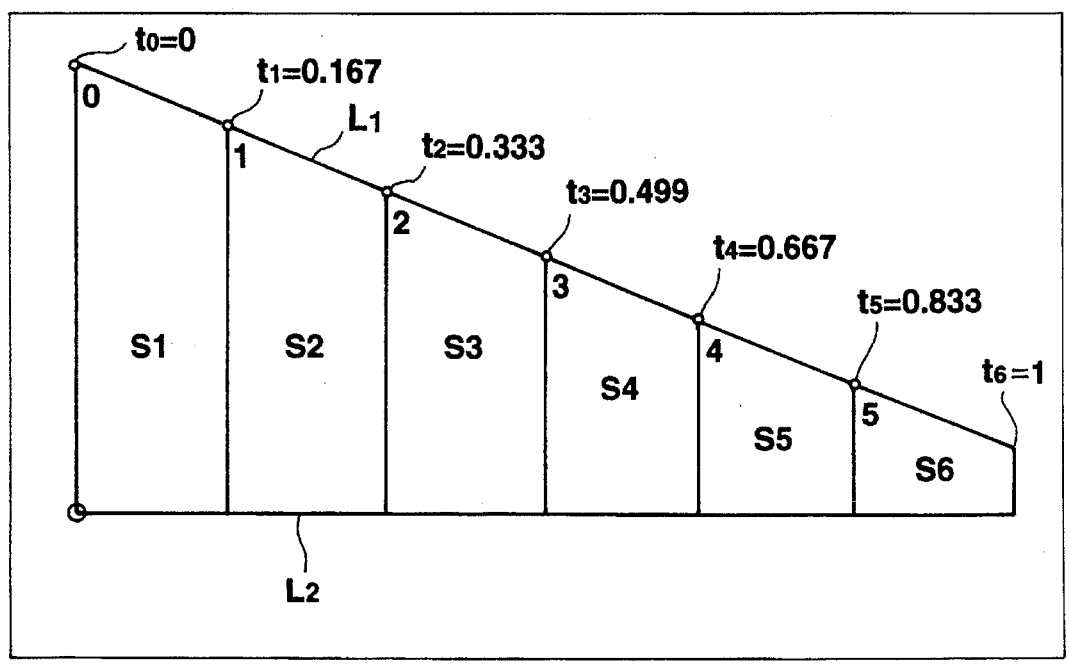

The thus acquired coordinates of the character frames of all the characters have been obtained from the arithmetical progressional parameters generated from the simple-divided variable generator 5-4. As shown in FIG. 3A, the individual character frames do not have consistent shapes and the first character frame on the left-hand end is considerably tall (long in the vertical direction) while the sixth character frame on the righthand end is wide (long in the horizontal direction); i.e., the character frames do not have balanced shapes.

In this embodiment, after the arithmetical progressional parameters are obtained, the area calculator 5-8 is activated. Then, the area calculator 5-8 computes the areas of the individual character frames, frame by frame, based on the contents of the character frame buffer 5-7, and acquires the sum of the areas of all the character frames. S1 to S6 in FIG. 3A indicate the areas of the individual character frames. With regard to one target character frame, the area transform equation variable generator 5-9 divides the sum of the areas from the left-hand end of the character train to the right-hand end of the target character frame by the total area S0 to thereby compute the value of the parameter of the right side of the target character frame. Then, the character frame adjoining to the right is taken as the next target. The area of this character frame is added to the above sum of the areas and the resultant area is divided by the total area S0 to acquire the parameter on the right side of that character frame. That is, the individual parameters $t_1$, $t_2$, $t_3$, $t_4$ and $t_5$ are obtained as follows.

$$t_1=S1/S0,$$

$$t_2=S1+S2/S0,$$

$$t_3=S1+S2+S3/S0,$$

$$t_4=S1+S2+S3+S4/S0,$$

$$t_5=S1+S2+S3+S4+S5/S0$$

Figure 3B:
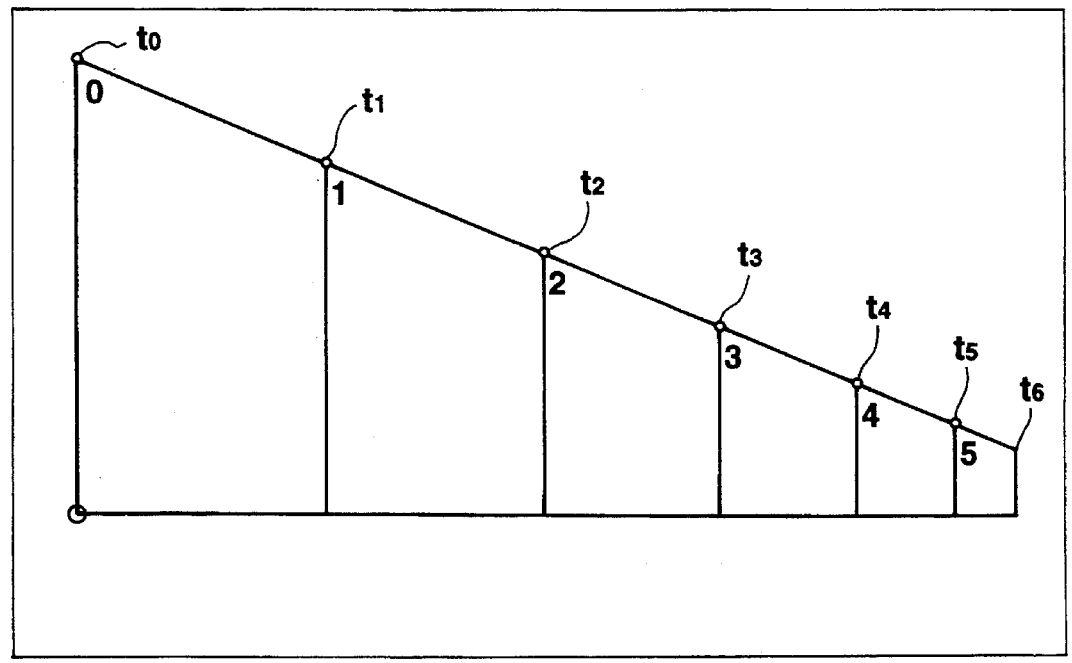

Accordingly, a row of new variables is set in the selective output section 5-5. Using the new parameters, the coordinate calculator 5-6 performs the coordinate computation again to acquire the coordinates of the individual character frames and sets them again in the character frame buffer 5-7. FIG. 3B indicates the character frames in this case, and the individual character frames have similar shapes; the taller the character frame is, the wider that character frame becomes, and the shorter the character frame is, the narrower that character frame becomes, thus providing character frames which have natural linkages. When the coordinates of the character frames of all the characters are set in the character frame buffer 5-7, the character frame generation controller 5-3 informs the main controller 2 the end of the computation. Then, the coordinates of the character frames are read from the character frame buffer 5-7 of the character frame generation controller 5, character by character, and are sent to the print data generator 6. At this time, the print data generator 6 converts the character codes, read from the character layout memory 4 character by character, into a character pattern, converts the character pattern to the size corresponding to the character frames, and causes the printer 9 to print out the character pattern.

Figure 4A:
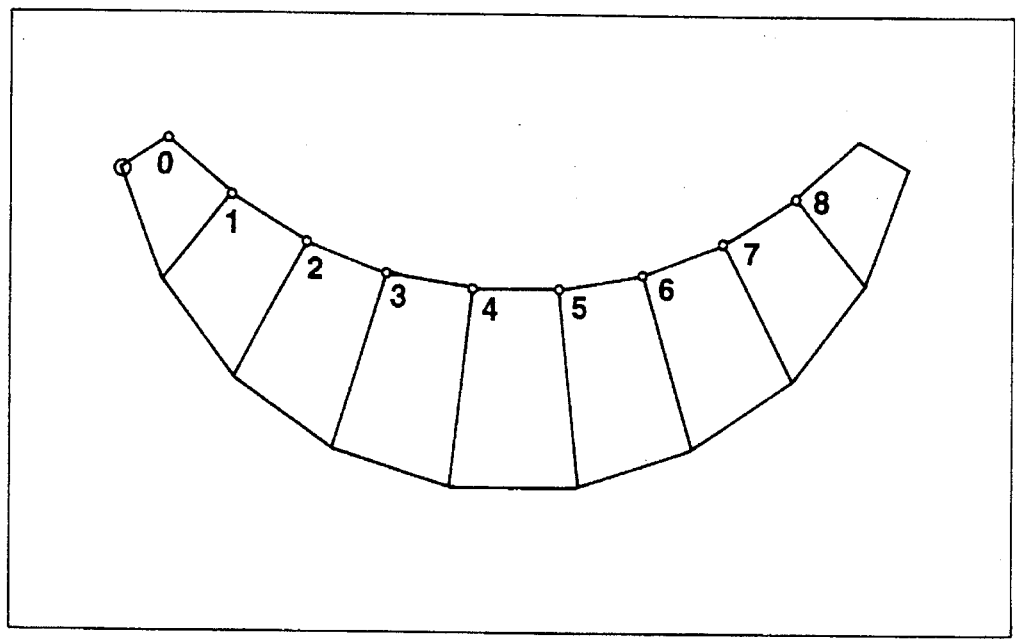
Figure 4B:
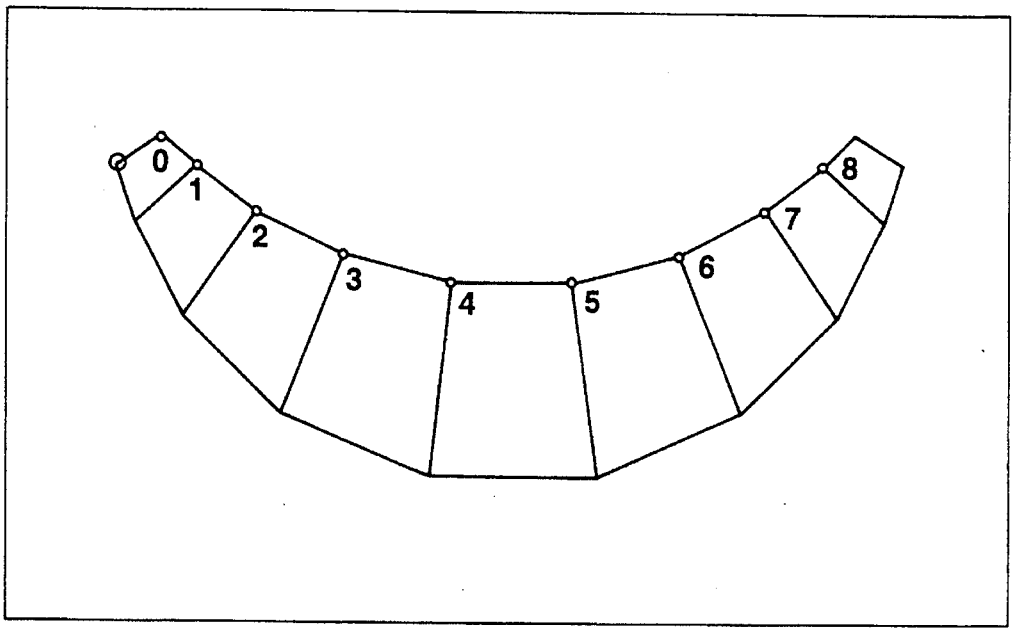

FIGS. 4A and 4B illustrate the divided states of the character frames assigned into the character layout range in the case where a character train consisting of nine characters is laid out in the area defined by two arcs as the character layout range, FIG. 4A showing the divided state before compensation while FIG. 4B shows the divided state after compensation. When two arcs are used as in the above case, with the angle considered as a parameter, the same operation as performed in the above-described case of straight lines will be executed thereafter. The center portions of the character frames before compensation resulting from simple division are very tall in the vertical direction and the right- and left-end portions become very wide in the horizontal direction, as shown in FIG. 4A, while the individual character frames after the compensation executed using the area computation have similar shapes, though slightly elongated vertically, as shown in FIG. 4B.

Figure 5A:
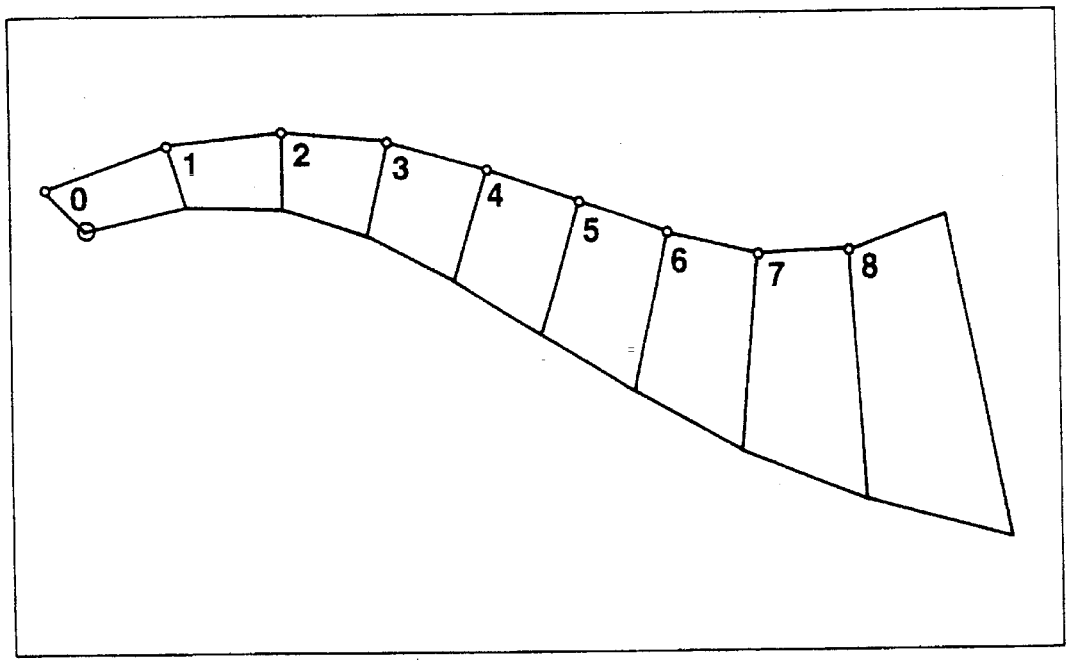
Figure 5B:
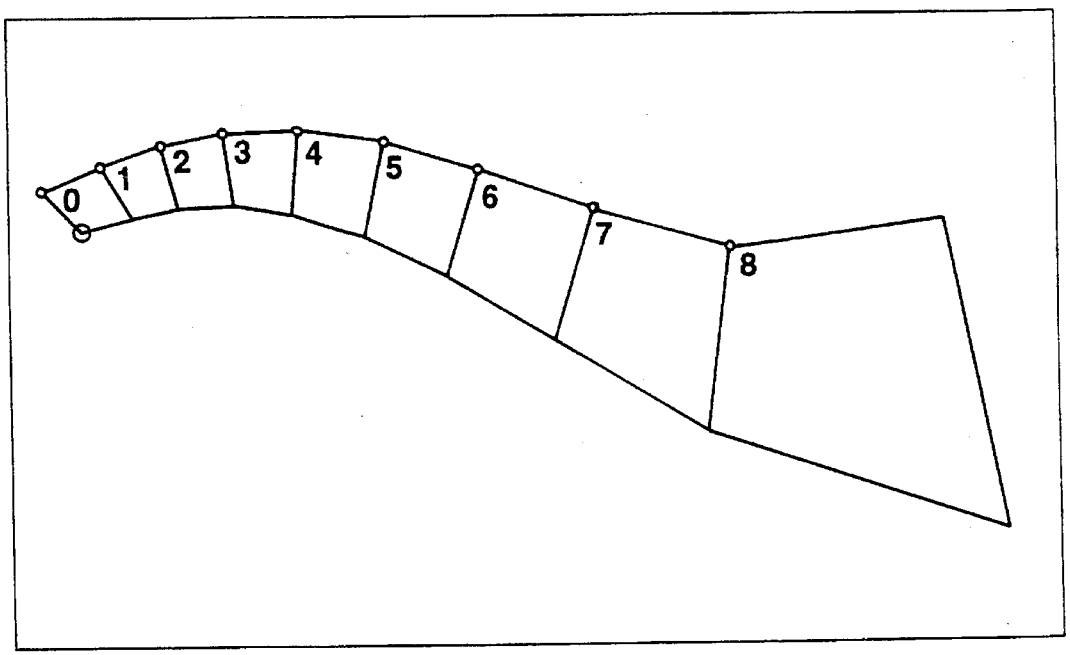

FIGS. 5A and 5B illustrate the divided states of the character frames assigned into the character layout range in the case where a character train consisting of nine characters is laid out in the area defined by two Bezier curves as the character layout range, FIG. 5A showing the divided state before compensation while FIG. 5B shows the divided state after compensation. The individual character frames before compensation center portions of the character frames resulting from simple division, which are simply divided with nearly constant changes in the width and height, do not have balanced shapes and the right-hand character frames are prominently tall while the left-hand character frames are prominently wide, as shown in FIG. 5A. On the other hand, the individual character frames after the compensation executed using the area computation have similar shapes, though slightly elongated vertically, and have natural linkages as shown in FIG. 5B.

In short, according to this embodiment, arithmetical progressional parameters are acquired by the simple-divided variable generator 5-4, the character frame coordinates are determined in accordance with the parameters, then new parameters are obtained from the areas of the individual character frames, and the widths of the character frames are compensated based on the new parameters. It is therefore possible to obtain a more natural shape of a character train as compared with simple division. Further, the character train and the layout range have only to be designated, so that the desired character train shape can be obtained with a simple operation.

Second Embodiment

Figure 6:
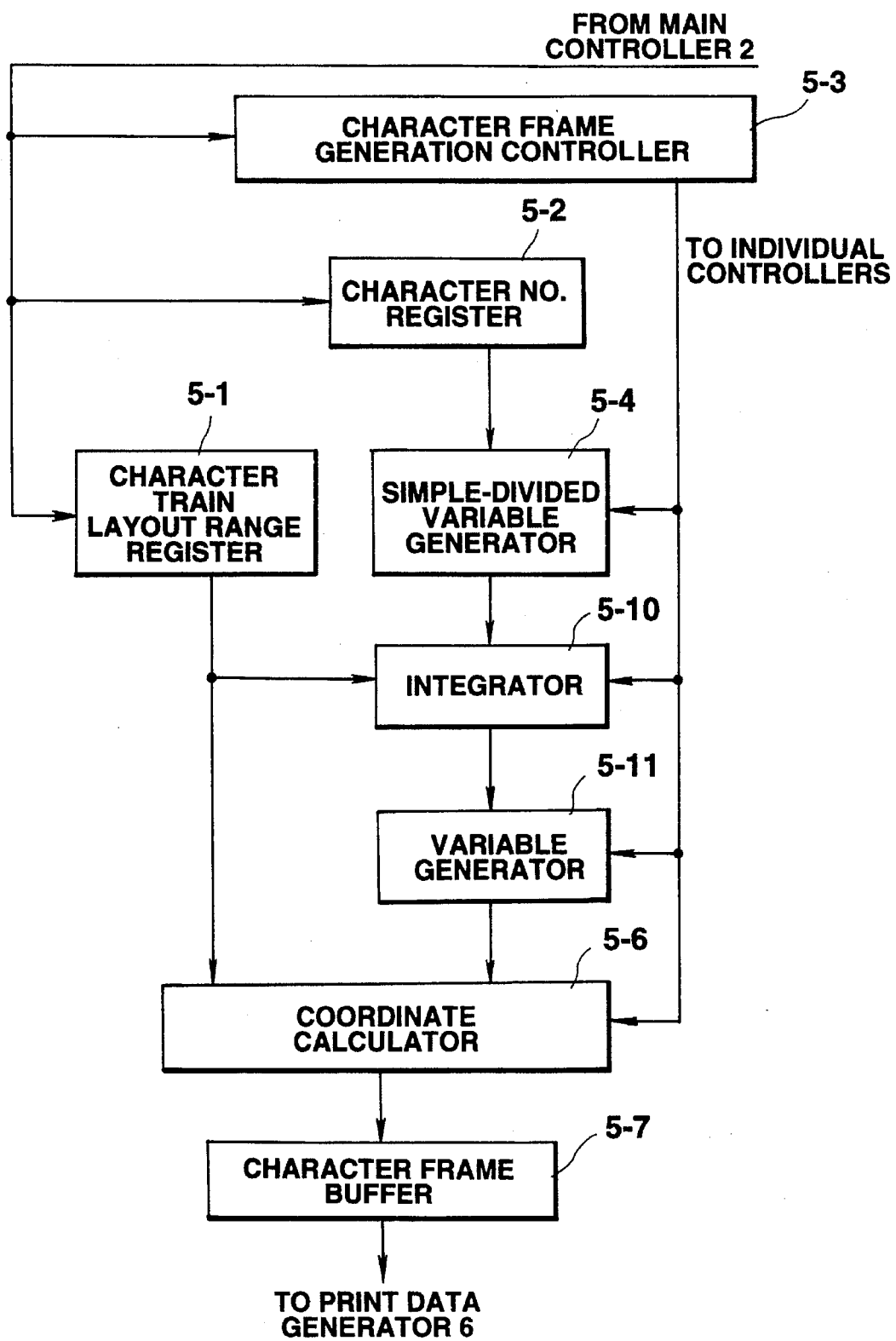
FIG. 6 is a block diagram showing the structure of a character frame generator in a character train outputting apparatus according to a second embodiment of the present invention.

FIG. 6 presents a block diagram showing the structure of a character train outputting apparatus according to a second embodiment. The components similar or identical to those of the first embodiment are denoted by the same reference numerals to avoid their repetitive description.

Although all the character frame coordinates for all the characters in a character train are generated and the areas of the character frames are then computed in the first embodiment, the areas may be directly computed by an integral equation in some cases as each character frame is expressed by a function of parameters. For instance, when two lines defining the character train layout range are both straight lines or quadratic curves, the areas can easily computed by an integral equation.

Suppose that for a parameter t, points on two lines are p and q respectively. A length l connecting p and q is a function of t and is set as h(t). When a primitive function H(t) of h(t) is obtained and t is input in the primitive function, the results become the values of a definite integral between "0" and "t." In this embodiment, therefore, an integrator 5-10 for outputting definite integral values is provided. The parameters generated from the simple-divided variable generator 5-4 and data representing two lines from the character train layout range register 5-1 are input to the integrator 5-10. Based on those input data, the integrator 5-10 performs integration and supplies the result to a variable generator 5-11, which computes G(t)/G(1). The integrator 5-10 computes G(1) and stores the result in the variable generator 5-11 first. Then, the integrator 5-10 acquires G(t) and supplies the result to the variable generator 5-11. Based on those values, the variable generator 5-11 computes G(t)/G(1), and the coordinate calculator 5-6 computes coordinates again based on newly obtained parameters.

In this embodiment having the above structure, the coordinate buffer register/selective output section 5-5 shown in FIG. 2 becomes unnecessary, new parameters can be obtained spontaneously by computing G(t)/G(1) in the variable generator 5-11, and the character frame coordinates for one character are generated by a single function of the coordinate calculator 5-6. The processing in the second embodiment is faster than in the first embodiment. If a function which continuously varies irrespective of two lines is assigned to the primitive function H(t), various special effects (e.g., an effect of sticking a character train on a cylinder in the case of a trigonometric function) can be provided.

Although an arbitrary line type is selected from a straight line, an arc and Bezier curve to designate a character train layout range in the above-described embodiments, the line type is not limited to those types, and the character train layout range may have an arbitrary shape as long as the amount of change in the height of the individual characters do not change extremely.

Third Embodiment

FIGS. 7 through 14 illustrate a character train outputting apparatus according to a third embodiment, as applied to a word processor.

Figure 7:
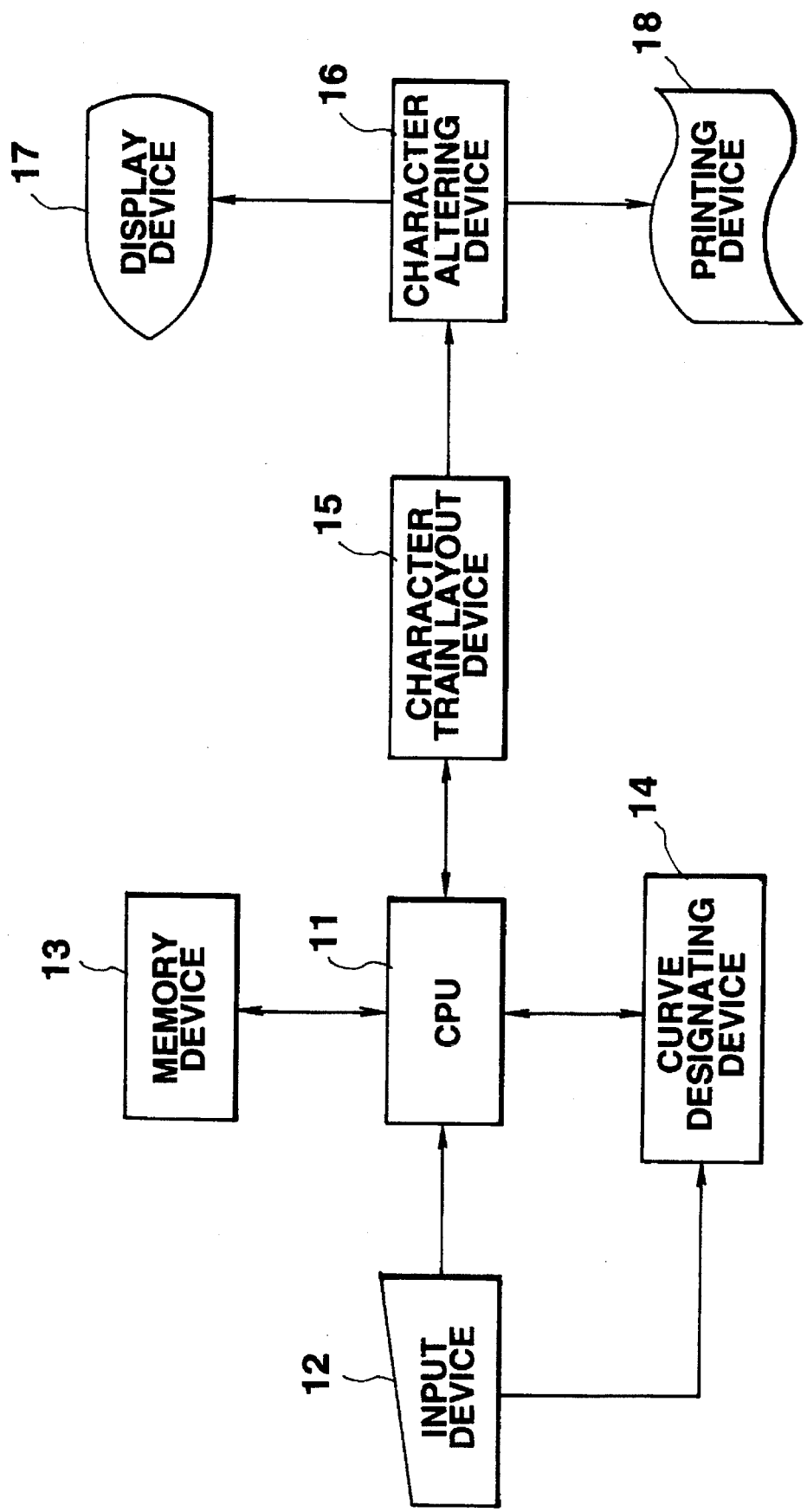
FIG. 7 is a block diagram showing the structure of a character train outputting apparatus according to a third embodiment of the present invention.

To begin with, the structure will be described. FIG. 7 is a block diagram of a word processor. In this diagram, a CPU 11 performs the general control of the apparatus and performs a setting process which will be described later. The CPU 11 controls various operations of the word processor according to a microprogram stored in a ROM (not shown). Connected to the CPU 11 are an input device 12 comprising a keyboard or the like for inputting a train of characters and designating curves, a memory device 13 including a RAM for storing the character train input from the input device 12 and storing curve information designated as plural pieces of coordinate information (FIG. 8) by a curve designating device 14 (which will be described later), the curve designating device 14 for computing information of the curves, designated through the input device 12, as plural pieces of coordinate information, a character train layout device 15 for dividing a closed curved surface surrounded by curved lines by a predetermined area ratio according to the number of layout characters based on the character train stored in the memory device 13 and information of the closed curved surface (FIG. 9) and for computing layout information (FIG. 10) for laying out the character train, a character altering device 16 for computing the shape of each character in the character train based on the layout information computed by the character train layout device 15, a display device 17 for displaying input image data on the screen, and a printing device 18 for printing out characters, etc.

The input device 12 comprises a keyboard having keys for entering alphanumerals, kana (Japanese alphabets), etc., and functions keys, such as cursor keys, an execution key and an interruption key, and a mouse as a pointing device. The input device 12 is used as position designating means to input a train of characters and designate curves. In this case, a curve, such as a straight line, a Bezier curve or a quadratic curve, is specified by a user designating a plurality of coordinates (coordinate information) as shown in FIG. 8, or an arbitrary curve is designated by the user using the pointing device such as a mouse.

The curve designating device 14 computes plural pieces of coordinate information, which can specify a curve selectively input from a group of data representing curves. This embodiment employs a method of inputting coordinate information to designate a curve, and stores the designated plural pieces of coordinate information into the memory device 13.

Figure 8:
FIG. 8 is a diagram showing coordinate information for the character train outputting apparatus.
Figure 9:
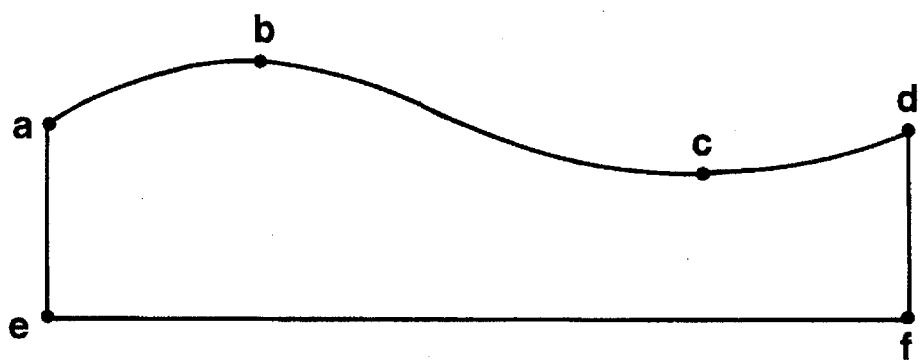
FIG. 9 is a diagram showing closed curve surface information for the character train outputting apparatus.
Figure 10:
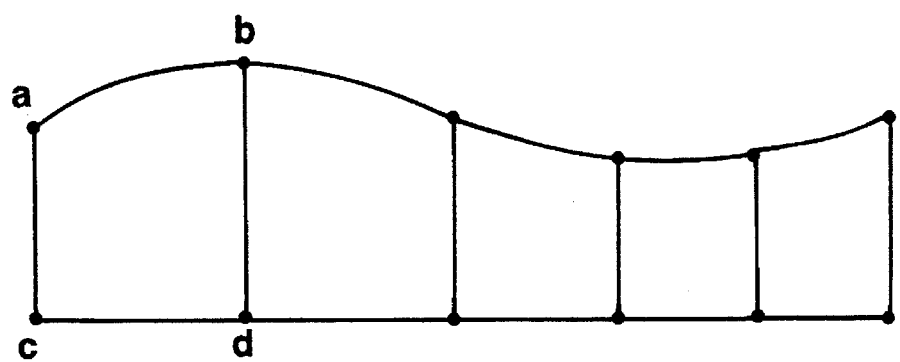
FIG. 10 is a diagram showing layout information for the character train outputting apparatus.

The character train layout device 15 connects the end points of computed two curves to calculate information of a closed curved surface as shown in FIG. 8, and divides the acquired, closed curved surface in accordance with the number of characters in the character train to determine the region for laying out one character (see FIG. 9). As shown in FIG. 9, this region for a single character is indicated by the coordinates of four points (a, b, c, d), and those coordinates become layout information.

The character altering device 16 alters each input character data based on the layout information.

The operation of this embodiment will now be described.

Figure 11:
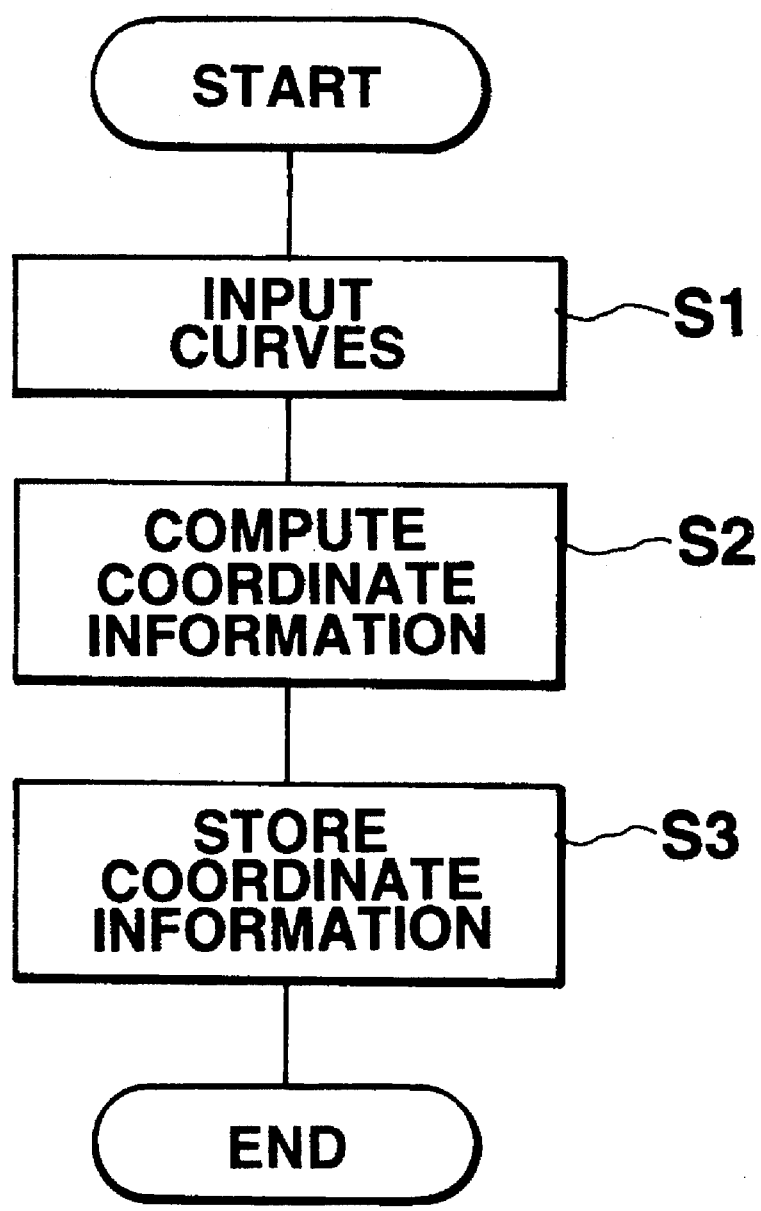
FIG. 11 is a flowchart illustrating a process of computing coordinate information for the character train outputting apparatus.

FIG. 11 is a flowchart illustrating a program of computing coordinate information of a curve.

When the program is invoked, two curves are input through the input device 12 in step S1, and the coordinate information of the input curves are computed in step S2. For instance, the coordinate information of a straight line is specified by two points and the coordinate information of a curve (Bezier curve) by four points as shown in FIG. 8. Then, the computed coordinate information is stored in the memory device 13 in step S3 before terminating this flow.

Figure 12:
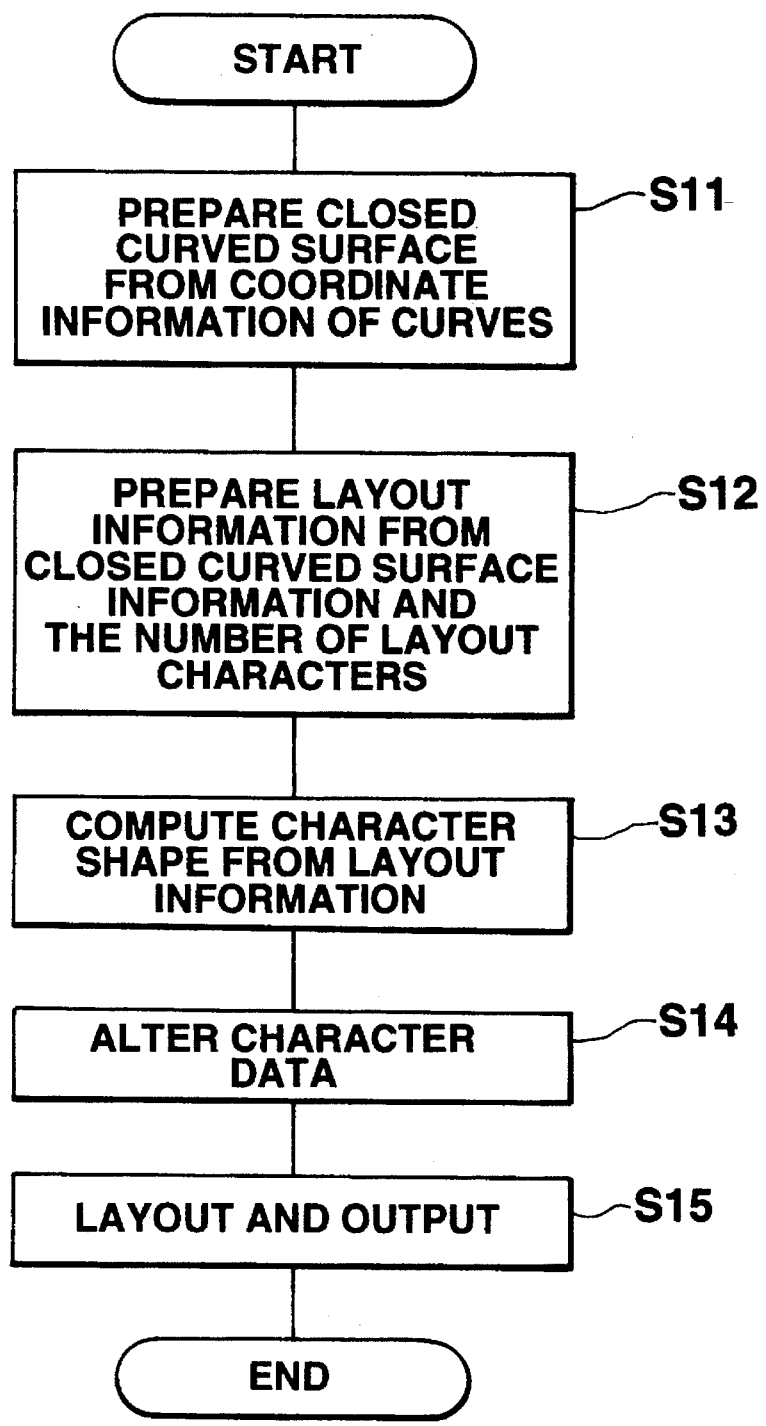
FIG. 12 is a flowchart illustrating a process of outputting a train of characters for the character train outputting apparatus.

FIG. 12 is a flowchart illustrating a program of outputting a train of characters. The process of this flowchart starts when a print or display instruction is given.

Figure 13:
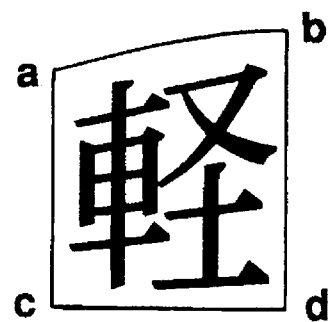
FIG. 13 is a diagram showing an example of an altered character in a character train from the character train outputting apparatus.
Figure 14:
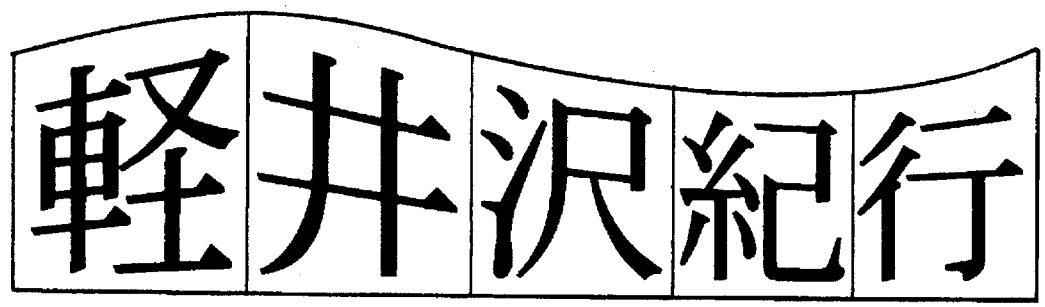
FIG. 14 is a diagram exemplifying the output of the character train outputting apparatus.

First, information of a closed curved surface is prepared from the coordinate information of curves in step S11. When there are a Bezier curve specified by the coordinate information of four points (a, b, c, d) and a straight line specified by the coordinate information of two points (e, d) as shown in FIG. 9, for example, the closed curved surface information is the shape acquired by connecting the end points (a, d, e, f) of the two lines. Then, layout information is prepared based on the acquired, closed curved surface information and the number of characters to be laid out in the closed curved surface in step S12. This layout information indicates an area for displaying a single character in the closed curved surface; for example, the coordinates of four points (a, b, c, d) shown in FIG. 10 become the layout information of one character in the closed curved surface shown in FIG. 9. In this embodiment, in dividing the closed curved surface by the number of characters, the character width is changed in accordance with the character height in such a way that with a tall character, its character width becomes wider. In this case, the closed curved surface may be divided by an area ratio or the like, or may evenly be divided simply in accordance with the number of characters. Next, the shape of each input character is computed based on the prepared layout information of the individual characters in step S13, character data is changed according to the character shape by the character altering device 16 in step S14. FIG. 13 illustrates an example of an altered character when a Japanese Kanji character "軽" is laid out in the area specified by the layout information for the first character in FIG. 10. Then, the altered character train is sent to the display device 17 or printing device 18 to be displayed or printed out in step S15 before terminating this flow. FIG. 14 illustrates an example of the output when a Japanese Kanji character train "軽井沢紀行" is laid out in the closed curved surface surrounded by the curves in FIG. 10. In this embodiment, "curve" or "curves" include a straight line which is one form of a curve.

As described above, the word processor according to the third embodiment is designed to alter a character train according to the shapes of two curves which define a closed curved surface, and lay out the altered character train in that closed curved surface. It is therefore possible to lay out and print a character train in the closed curved surface surrounded by arbitrary curves, and prepare expressive characters that could not be presented by the conventional word processors, thus significantly widening the application of word processors.

Although the frame of an outline font is displayed at the time of edition and the outline font corresponding to the frame is printed at the printing time in this embodiment, the outline font may of course be displayed on the editing screen.

Although this embodiment is a character train outputting apparatus as applied to a word processor, this invention may also be applied to any other apparatus having a function of outputting outline fonts, such as a personal computer.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A character train outputting apparatus comprising:

character train designating means for optionally designating a train of characters as an output target;

layout range designating means for optionally designating an area lying between at least two optional lines as a character train layout range;

character frame determining means for dividing said area, designated by said layout range designating means, into strips having a substantially equal width by the number of characters in said character train designated by said character train designating means, to thereby determine character frames for that number of characters;

compensation means for compensating a width of each character frame, based on ratios of occupied areas of individual character frames determined by said character frame determining means such that the larger the occupied areas of the individual character frames are, the wider the individual character frames become; and output means for altering said individual characters to sizes corresponding to sizes of said character frames compensated by said compensation means, and for laying out said altered characters in said associated character frames, when laying out the train of characters designated by said character train designating means.

2. The character train outputting apparatus according to claim 1, wherein the layout range designating means designates two lines optionally from straight lines, curves and a combination of the straight lines and the curves.

3. A character train outputting apparatus comprising:

character train designating means for optionally designating a train of characters as an output target;

layout range designating means for optionally designating an area lying between at least two optional lines as a character train layout range;

means for partitioning the area designated by said layout range designating means into individual sections by the number of characters in the character train designated by the character train designating means, and for obtaining areas of the partitioned sections;

means for compensating the sizes of the individual sections such that the larger the areas occupied by the individual sections, the wider the sections become; and output means for altering the individual characters to sizes corresponding to the sizes of the individual sections, and for laying out the altered characters in the associated sections, when laying out the individual characters of the character train designated by the character train designating means.

4. The character train outputting apparatus according to claim 3, wherein the layout range designating means designates two lines optionally from straight lines, curves and a combination of the straight lines and the curves.

5. A character train outputting apparatus comprising:

character train designating means for optionally designating a train of characters as an output target;

layout range designating means for optionally designating an area lying between at least two optional lines as a character train layout range;

means for partitioning the area designated by said layout range designating means into individual sections by the number of characters in the character train designated by the character train designating means, and for obtaining areas of the partitioned sections;

area compensating means for compensating the sizes of the individual sections such that the higher the individual sections are, the wider the sections become, when partitioning the area designated by said layout range designating means into sections by the number of characters of the character train designated by the character train designating means; and output means for altering the individual characters to sizes corresponding to the sizes of the sections, and for laying out the altered characters in said associated sections, when laying out the individual characters of the character train designated by the character train designating means.

6. The character train outputting apparatus according to claim 5, wherein the layout range designating means designates two lines optionally from straight lines, curves and a combination of the straight lines and the curves.

* * * * *